United States Patent [19]

Kobashi et al.

[11] 4,049,605
[45] Sept. 20, 1977

[54] PROCESS FOR THE POLYMERIZATION OF ACRYLONITRILE

[75] Inventors: Toshiyuki Kobashi; Masahiko Ozaki; Kenichi Ono; Noboru Abe, all of Okayama, Japan

[73] Assignee: Japan Exlan Company Limited, Osaka, Japan

[21] Appl. No.: 604,043

[22] Filed: Aug. 12, 1975

[30] Foreign Application Priority Data

Aug. 13, 1974  Japan ................................. 49-92911

[51] Int. Cl.$^2$ ............................................. C08F 20/44
[52] U.S. Cl. ........................ 260/29.6 AN; 204/159.22; 260/2.5 R; 260/79.3 M; 526/218; 526/219; 526/227; 526/230; 526/303; 526/312; 526/317; 526/328; 526/330; 526/341; 526/342
[58] Field of Search ................. 260/85.5 R, 85.5 P, 260/88.7 R, 88.7 G, 29.6 AN; 526/341, 342, 227, 230, 218, 219

[56] References Cited

U.S. PATENT DOCUMENTS

| 3,499,879 | 3/1970 | Kobayaski et al. | 260/88.7 R |
|---|---|---|---|
| 3,719,648 | 3/1973 | Frielink | 260/85.5 R |
| 3,873,508 | 3/1975 | Turner | 260/85.5 R |

Primary Examiner—Harry Wong, Jr.
Attorney, Agent, or Firm—Wenderoth, Lind & Ponack

[57] ABSTRACT

The present invention relates to a process for the polymerization of acrylonitrile or a monomer mixture containing acrylonitrile as a main component and at least one other ethylenically unsaturated compound, characterized in that the polymerization is conducted at a temperature above 120° C. under a pressure above the vapor pressure generated in the polymerization system under the polymerization conditions in a system in which water is present in a range of 3 to 50 percent by weight based on the total weight of the monomer(s) and water to produce an acrylonitrile polymer in a substantially molten state. The polymers produced according to the above process have the advantage of being able to be directly shaped by extrusion without the need of solvents.

9 Claims, No Drawings

PROCESS FOR THE POLYMERIZATION OF ACRYLONITRILE

The present invention relates to a new process for polymerizing acrylonitrile or a monomer mixture containing the same. More particularly, the invention is concerned with a process for polymerizing acrylonitrile alone or a monomer mixture containing acrylonitrile in the presence of a small amount of water at a high temperature under an increased pressure, thereby producing a polymer of acrylonitrile which is in a substantially melted or liquid state.

As is well known, polymers of acrylonitrile are useful for making shaped articles such as fibers, films and the like having excellent properties. But as different from other polymers like polyamides, polyesters, etc., they are not melted by heat, and therefore to produce these articles, it is necessary to use an organic solvent such as dimethylformamide, dimethylacetamide, dimethyl sulfoxide, ethylene carbonate, etc., or an inorganic solvent such as a concentrated aqueous solution of thiocyanate, zinc chloride, nitric acid, etc. In producing fibers, for example as seen in U.S. Pat. Nos. 2,404,725 to 2,404,728, U.S. Pat. No. 2,652,390 and Japanese Patent Publication 6617/1954, a technique is generally adopted wherein an acrylonitrile polymer is produced by aqueous polymerization using a large amount of water, and then the polymer is dissolved in the above-mentioned solvent to form a spinning solution, which is then formed into fibers by the wet-spinning process or dry-spinning process. In this method, however, the process is complicated since the polymerization step and the dissolution step are separated. Moreover a large amount of water is used in the polymerization and in washing the resulting polymer, and a large amount of heat energy is required for the dissolution of the polymer. This method further involves various drawbacks such as loss of the monomer due to the formation of polymerization by-products, the necessity of removal of such by-products, the use of expensive solvents, and the necessity of recovering and purifying the solvents, etc.

As a method of carrying out the polymerization and dissolution of the resulting polymer in one step, there is a solution polymerization process, as seen in U.S. Pat. Nos. 2,356,767 and 2,425,191, wherein the polymerization is performed in the presence of a solvent which is capable of dissolving the resulting polymer. But, even in this process, so far as a solvent is used, an increase in production cost is inevitable. In addition, not to speak of the necessity of recovering the solvent, there is a necessity of purifying the recovered solvent to a high degree of purification in order to avoid an adverse effect on the polymerization.

On the other hand, as a method of obtaining shaped products without the use of such solvents, there are known a molding process wherein an acrylonitrile polymer is shaped at high temperature and pressure, and a casting process wherein the polymerization and shaping are performed at the same time. Some of the disadvantages in these processes are that the polymerization step and the shaping step are separated and a high pressure shaping operation and long time polymerization operation are required. There is, however, a fundamental problem in these processes themselves in that the production of fine products such as fibers is difficult because extrusion shaping is not successful.

Under these circumstances, in order to solve these problems, we have researched a polymerization process which would give a polymer that could be directly shaped by extrusion after polymerization, without the use of a solvent. As a result, we have found that, by polymerizing acrylonitrile alone or a monomer mixture containing acrylonitrile in the presence of a small, specific amount of water, under a specific pressure and at a specific temperature, an acrylonitrile polymer fluid can be produced which is in a substantially melted state.

A first object of the present invention, therefore, is to provide a new process for polymerizing acrylonitrile or a monomer mixture containing the same, whereby a polymer in a substantially melted state can be produced.

A second object of the present invention is to accomplish the polymerization of acrylonitrile or a monomer mixture containing the same and the melting of the polymer obtained from said monomer or monomer mixture, in a single and simple step.

A third object of the present invention is to provide a process for converting acrylonitrile or a monomer mixture containing the same to a flowable and substantially melted polymer in the form of liquid, by a polymerization operation in a short period of time.

A fourth object of the present invention is to provide an acrylonitrile polymer which can be directly brought to a shaping operation such as spinning, film formation, extrusion shaping, etc. by an energy economizing, highly productive and simplified process.

Other objects of the present invention will become apparent from the following concrete explanation of the invention.

These objects of the present invention can be achieved by polymerizing acrylonitrile alone or a monomer mixture composed of acrylonitrile as the main component and at least one other ethylenically unsaturated monomer as the remainder in a polymerization system in which water is present in an amount within the range of from 3 to 50 weight percent based on the total weight of the monomer(s) and water, under a pressure above the vapor pressure which will be generated in the polymerization system under the polymerization conditions, at a temperature above 120° C. By the adoption of this polymerization process, it has now become possible to obtain an acrylonitrile polymer which is in a substantially liquid or melted state, accordingly flowable, and which is homogeneous and transparent. In this process, by particularly using an oil-soluble radical generating agent of which the decomposing temperature for obtaining a half-life period of 10 hours is above 80° C., it becomes possible to make the polymerization proceed homogeneously and effectively, while avoiding the occurrence of a runaway reaction. Therefore, the objects and effects of the present invention can be achieved more satisfactorily and successfully in this way.

While a clear account has not yet been given of the phenomenon that the acrylonitrile polymer formed under the specific polymerization conditions of such pressure and temperature melts, a possible supposition is that, by a synergic action between unreacted monomer remaining in the polymerization product and water, the cohesive force due to the interaction of the $-C\equiv N$ groups between the molecular chains of the acrylonitrile polymer is weakened markedly, thereby making the resulting polymer extremely easy to melt.

This pressurized, homogeneous phase polymerization process according to the present invention is applicable to the polymerization of acrylonitrile alone or to the polymerization of a monomer mixture composed of acrylonitrile as the main component (preferably above about 75 weight percent) and at least one other ethylenically unsaturated compound as the remainder. The other ethylenically unsaturated compounds which may be used for the copolymerization components include known unsaturated compounds that are copolymerizable with acrylonitrile, for example vinyl halides and vinylidene halides such as vinyl chloride, vinyl bromide, vinyl fluoride, vinylidene chloride; unsaturated carboxylic acids such as acrylic acid, methacrylic acid, maleic acid, itaconic acid, and their salts; acrylic acid esters such as methyl acrylate, ethyl acrylate, butyl acrylate, octyl acrylate, methoxyethyl acrylate, phenyl acrylate, cyclohexyl acrylate; methacrylic acid esters such as methyl methacrylate, ethyl methacrylate, butyl methacrylate, octyl methacrylate, methoxyethyl methacrylate, phenyl methacrylate, cyclohexyl methacrylate; unsaturated ketones such as methyl vinyl ketone, phenyl vinyl ketone, methyl isopropenyl ketone; vinyl esters such as vinyl formate, vinyl acetate, vinyl propionate, vinyl butyrate, vinyl benzoate; vinyl ethers such as methyl vinyl ether, ethyl vinyl ether; acrylamide and its substitution compounds; unsaturated sulfonic acids such as vinylsulfonic acid, allylsulfonic acid, methallylsulfonic acid, p-styrenesulfonic acid and their salts; styrene and their alkyl or halogen substitution compounds such as α-methylstyrene, chlorostyrene; allyl alcohol and its esters or ethers; basic vinyl compounds such as vinylpyridine, vinylimidazole, dimethylaminoethyl methacrylate; vinyl compounds such as acrolein, methacrolein, vinylidene cyanide, glycidyl methacrylate, methacrylonitrile.

The pressurized, homogeneous phase polymerization process according to the present invention has a marked difference from the conventional aqueous suspension polymerization process, emulsion polymerization process, solution polymerization process or bulk polymerization process in that a small amount of water is present in the polymerization system. Namely, as is different from the bulk polymerization process in which the polymerization system contains no water, or the aqueous polymerization processes or the solution polymerization process in which a very high percentage of water or solvent is present in the polymerization system, the present invention uses 3 to 50 weight percent, preferably 5 to 30 weight percent, most preferably 5 to 20 weight percent water based on the total weight of the monomer(s) and water constituting the polymerization system. It is necessary that the polymerization system be maintained under a pressure above the vapor pressure which will be generated under the polymerization conditions. In addition, it is necessary to adopt a temperature above 120° C., preferably above 130° C. as the polymerization temperature. Only by satisfying such polymerization conditions, it is possible to obtain an acrylonitrile polymer melt in a liquid phase which is flowable and transparent. The use of polymerization conditions outside these limits will hinder the achievement of the objects and effects of the present invention. It is desirable that the upper limit of the polymerization temperature be below 300° C., preferably below 250° C., in consideration of possible deterioration of polymer qualities, such as decomposition, coloring, etc.

The polymerization according to the present invention is carried out in a closed system or using a polymerization apparatus having a suitable pressurizing means, by which the polymerization system is maintained under a pressure above the vapor pressure that will be generated under the polymerization conditions (self-generated pressure), generally above about 3 atmospheres. As the polymerization pressure, any pressure may be selected provided that it is above the above-mentioned pressure (self-generated pressure). Therefore, it is possible to effect the polymerization operation of the present invention at a high pressure above 100 atmospheres or even above 1000 atmospheres. Generally, however, it is advisable to carry out the polymerization under a pressure of about 5 atmospheres to about 50 atmospheres for the ease of industrial operation and in consideration of the removal step of the resulting polymer melt from the polymerization system to shape it into fibers, films, etc.

As the polymerization initiating means used in the present invention, all the methods heretofore known can be used, for example, the radical polymerization using radical generating agents such as organic peroxides, azo compounds, etc., the direct photopolymerization by the irradiation of ultraviolet ray or the photosensitized polymerization in the presence of a photosensitizing agent, or the polymerization by the irradiation of γ-ray. The selection of which of these polymerization initiating means to employ is properly determined depending on the polymerization conditions and the polymerization apparatus used, and the purpose of use of the resulting polymer. However, the objects and effects of the present invention are more satisfactorily attained by using, as the catalyst, an oil-soluble radical generating agent of which the decomposing temperature for obtaining a half-life period of 10 hours (i.e. the temperature at which half the amount of use can be decomposed in 10 hours) is above 80° C., preferably above 100° C. This results from the fact that the use of such an oil-soluble radical generating agent prevents the reaction from running away and facilitates the polymerization operation and the acquisition of a high molecular weight polymer of a uniform molecular weight.

As such oil-soluble radical generating agents, there may be mentioned, for example organic peroxides such as di-tert-butyl diperoxyphthalate, tert-butyl hydroperoxide, di-tert-butyl peroxide, 2,5-dimethyl-2,5-di-tert-butyl peroxyhexine; and azo compounds such as 4-azobis-4-cyanopentanoic amide and 1-azobis-1-cyclohexanecarbonitrile.

The desirable amount to use of such a catalyst is generally 0.01 to 3 weight percent, preferably 0.1 to 2 weight percent based on the weight of the monomer or monomer mixture.

The molecular weight control of the resulting polymer in the present invention can be effected not only by changing the amount of addition of the catalyst or the irradiation intensity of γ-ray, but also by the use of known chain transfer agents such as amines, alcohols, benzene substitution compounds, chloroform, mercapto compounds, ketones, etc.

In the practice of the invention, the addition of polymerization retarding agents to the reaction system is frequently performed in order to suppress the occurrence of a sudden polymerization reaction at the early stage of the polymerization and to avoid an abrupt, extraordinary rise of pressure.

The pressurized, homogeneous phase polymerization according to the present invention is initiated in a mixture liquid consisting of the monomer(s) and a specific amount of water, and containing a catalyst, additive, etc. used as occasion demands. On the other hand, it is possible to initiate the polymerization in a system which is formed by adding a previously formed acrylonitrile polymer in powder form or in granular form (this acrylonitrile polymer may be produced by any polymerization process) to the above-mentioned polymerization reaction liquid consisting of the monomer(s) and water. In this case, the polymerization system at the start of the polymerization is heterogeneous, but with the progression of the polymerization, the polymerization liquid is converted into a homogeneous phase, and finally into a flowable, transparent polymer which is in a substantially melted state. It is also permissible to add additives for the property improvement of the resulting polymer. These additives may be, for example, anti-coloring agents, stabilizers against heat, flame retardants, antistatic agents, stabilizers against ultraviolet ray, pigments, etc. and are added to the polymerization system in an amount within the range that does not exert an evil effect on the pressurized, homogeneous phase polymerization of the present invention.

In the practice of the present invention, cases are sometimes met with, where in the early stage of the polymerization, the polymerization liquid does not become completely transparent but becomes a slightly turbid liquid representing fluidity, depending on the conditions of the polymerization temperature and polymerization velocity. But at the last stage of the polymerization, the liquid assumes a homogeneous phase which is transparent and viscous. Therefore, even if the polymerization liquid passes such a polymerization course, the practice of the present invention is not hindered thereby.

The polymerization time in the present invention varies depending on the polymerization initiating means, the type of the catalyst and the amount of its use, the polymerization temperature, etc. Generally, however, a value is adopted which is within the range of from 10 minutes to 2 hours, preferably from 20 minutes to 1 hour. It is an advantage of the present invention that the pressurized, homogeneous phase polymerization of the present invention can be carried out in such a short time. It offers no impediment to practice the polymerization reaction of the present invention in a batchwise or continuous system, or in a system in which both are combined.

The transparent, homogeneous acrylonitrile polymer fluid in a substantially melted state, produced according to the present invention may be directly subjected to spinning, film formation, molding, etc. The melt is particularly suitable for extrusion directly into a zone characterized by lower temperature and lower pressure than that in the reactor, to form fibers or films. Further, the fluid, after being mixed with a known solvent for acrylonitrile polymers (for example an aqueous solution of an inorganic salt such as sinc chloride, thiocyanate; inorganic solvent such as nitric acid; an organic solvent such as dimethylformamide, dimethyl-acetamide, dimethyl sulfoxide, γ-butyrolactone, ethylene carbonate, etc.) under pressure, may be produced into shaped articles such as fibers, films by means of wet-spinning, dry-spinning, etc. in the usual way. Further, if the pressure in the reactor (polymerization system) is lowered while the polymer melt is still heated there can be obtained a polymer foam.

In the present invention, since a practical polymerization ratio of from about 60 % to about 97 % is adopted, some amount of unreacted monomer remains in the resulting melted polymer. Such unreacted monomer is recovered in the process steps of spinning, film formation, molding, etc. by suitable means, and reused.

According to the present invention, the polymerization step can be extremely simplified, and the amounts of use of water and heat energy are greatly reduced. Furthermore, there is an advantage in that the problem of solvent recovery and its high purification can be avoided since shaped products can be obtained without the use of a solvent.

In the present invention, since the polymerization is carried out in a homogeneous system, heat transfer is easily effected. Accordingly, it is possible to suppress the accumulation of heat in the polymerization system and a runaway reaction, and further to make the polymerization reaction product uniform. Moreover, since the polymer represents fluidity as soon as the polymerization is finished, its transport or transfer is quite easy, which offers an industrial advantage.

Since the process of the present invention can be carried out at a low pressure below 50 atmospheres, the process is industrially extremely advantageous from the viewpoint of the structure of the reaction apparatus and production efficiency. Furthermore, it is a great advantage of the present invention that the polymerization and melting are simultaneously performed in one step to simplify the process. Other characteristic features of the present invention include a very low amount of polymerization by-products, which reduces monomer loss, and uniformity of the molecular weight of the resulting polymer.

The present invention is explained more concretely by way of examples hereinafter, but the scope of the invention is by no means limited by these examples. The parts and percentages in the examples are by weight unless otherwise indicated.

EXAMPLE 1

To a monomer mixture consisting of 90 % acrylonitrile and 10 % methyl acrylate, 1 % di-tert-butyl peroxide (of which the decomposing temperature for obtaining a half-life period of 10 hours is 124° C.) as the catalyst, and 1 % 3,5-di-tert-butyl-4-hydroxytoluene as the polymerization retarding agent both based on the weight of the monomer mixture, were added and dissolved therein. Then, 0.8 part of this monomer solution and 0.2 part of water were put in a hard glass tube, 5 mm in inner diameter and 150 mm in length, having the lower end closed. After the air in the upper space of the glass tube was replaced with nitrogen, the glass tube was sealed. The glass tube containing the polymerization reactants was allowed to stand in an oil bath, and the polymerization was carried out under the various polymerization conditions shown in Table 1. In all cases where the polymerization temperature was 130° to 220° C., a transparent and viscous polymer was obtained which was in a substantially melted state. The polymerization results are shown in Table 1. When the polymerization temperature was 115° C., a white chalky polymer representing no fluidity (not melted) was obtained. At a polymerization temperature of 100° C., only a slurry-like polymerization product was obtained.

When the above-mentioned monomer solution alone (containing no water) was enclosed in a glass tube and polymerized at 160° C. for 60 minutes, only a white chalky polymer representing no fluidity was obtained.

Table 1

| Polymerization temperature (° C.) | Polymerization time (min.) | Monomer conversion (%) | Molecular weight | Appearance |
|---|---|---|---|---|
| 100 | 20 | (trace) | — | Slurry-like |
| 115 | 60 | 36.5 | 127400 | White chalky |
| 130 | 20 | 51.0 | 15000 | Melted |
| 130 | 60 | 70.0 | 145200 | " |
| 140 | 60 | 78.0 | 109900 | " |
| 150 | 60 | 83.2 | 96700 | " |
| 160 | 20 | 79.2 | 61000 | " |
| 160 | 60 | 85.8 | 59300 | " |
| 190 | 20 | 64.4 | 69100 | " |
| 220 | 20 | 61.3 | 61300 | " |

EXAMPLE 2

The various monomer mixture solutions shown in Table 2, in which 1 % di-tert-butyl peroxide as the catalyst and 1 % 3,5-di-tert-butyl-4-hydroxytoluene as the polymerization retardant were dissolved, were polymerized in sealed glass tubes as in Example 1. (Incidentally, 0.2 part water had been mixed with 0.8 part monomer solution.) The polymerization temperature was 160° C., and the polymerization time was 30 minutes. All the thus-obtained polymerization products were transparent polymers representing good fluidity and were observed as being in a substantially melted state.

On the other hand, the above-mentioned polymerization was repeated without the addition of water. In any combination of the monomers, only a white chalky polymer was obtained which represented no fluidity.

Table 2

| Monomer composition and ratio | Monomer conversion (%) | Molecular weight |
|---|---|---|
| AN = 100 | 86.5 | 74300 |
| AN/VAc = 90/10 | 81.5 | 46400 |
| AN/MA = 90/10 | 77.0 | 68900 |
| AN/SMS = 98/2 | 82.8 | 59800 |
| AN/DAM = 90/10 | 84.0 | 32300 |
| AN/VdCl = 90/10 | 87.0 | 50000 |
| AN/AA = 90/10 | 93.2 | 35000 |
| AN/m-AA = 90/10 | 82.2 | 28200 |
| AN/MMA = 90/10 | 89.2 | 30400 |
| AN/AAm = 90/10 | 94.5 | 86400 |
| AN/VB = 90/10 | 89.5 | 60000 |

Note:
AN - Acrylonitrile, VAc = Vinyl acetate,
MA = Methyl acrylate, SMS = Sodium methallylsulfonate,
DAM = Dimethylaminoethyl methacrylate,
VdCl = Vinylidene chloride, AA = Acrylic acid,
m-AA = Methacrylic acid, MMA = Methyl methacrylate,
AAm = Acrylamide, VB = Vinyl benzene

EXAMPLE 3

In a monomer mixture consisting of 90 % acrylonitrile and 10 % methyl acrylate, 1 % 3,5-di-tert-butyl-4-hydroxytoluene as the polymerization retarding agent and each of the various catalysts shown in Table 3 were dissolved to prepare various polymerization liquids. Then, 0.2 part water was mixed with 0.8 part of each of the polymerization liquids, and each of the resulting mixtures was subjected to polymerization in a glass tube at 160° C. for 30 minutes. In every case, a transparent polymer fluid in a substantially melted state was obtained. The results of the polymerization are shown in Table 3.

Table 3

| Catalyst | Decomposing temp.[1] | Addition[2] (%) | Monomer conversion(%) | Mol. weight |
|---|---|---|---|---|
| tert-Butyl peroxymaleic acid | 96 | 1.0 | 35.2 | 60900 |
| Di-tert-diperoxyphthalate | 105 | 1.0 | 53.8 | 96300 |
| tert-Butyl hydroperoxide | 121 | 1.0 | 62.2 | 104200 |
| Di-tert-butyl peroxide | 124 | 1.0 | 77.0 | 68900 |
| 2,5-dimethyl-2,5-di-tert-butyl peroxyhexine | 135 | 1.0 | 67.3 | 116700 |
| 2,5-methylhexane-2,5-dihydroperoxide | 154 | 1.0 | 44.8 | 94100 |
| Azobisisobutyronitrile | 64 | 0.5 | 79.8 | 32100 |
| Benzyl peroxide | 74 | 0.5 | 82.7 | 31100 |

[1] The temperature at which half the amount of the catalyst is decomposed in 10 hours.
[2] The ratio based on the weight of the monomer mixture.

EXAMPLE 4

In a monomer mixture consisting of 90 % acrylonitrile and 10 % methyl acrylate, 1 % of each of the various chain transfer agents shown in Table 4 and 0.5 % di-tert-butyl peroxide as the catalyst were dissolved. Then, 0.8 part of each of these monomer solutions and 0.2 part of water were enclosed in a hard glass tube as in Example 1, and the solutions were allowed to stand in an oil bath at 150° C. for 60 minutes for polymerization. Transparent polymer fluids in a substantially melted state, having a properly controlled molecular weight were obtained. The results are shown in Table 4.

Table 4

| Chain transfer agent | Monomer conversion (%) | Molecular weight |
|---|---|---|
| Without addition | 88.9 | 61700 |
| tert-Butyl alcohol | 87.3 | 60700 |
| Benzene | 92.0 | 59500 |
| Methyl ethyl ketone | 90.1 | 57600 |
| n-Butyl alcohol | 89.1 | 55700 |
| Isobutyl alcohol | 84.6 | 54000 |
| Ethyl benzene | 86.8 | 52800 |
| sec-Butyl alcohol | 88.3 | 43700 |
| Thioglycolic acid | 85.0 | 39700 |

EXAMPLE 5

In a monomer mixture consisting of 90 % acrylonitrile and 10 % methyl acrylate, di-tert-butyl peroxide was dissolved as the catalyst in amounts shown in Table 5, respectively. Then, 0.8 part of each of the monomer solutions and 0.2 part water were enclosed in a glass tube as in Example 1. These glass tubes were allowed to stand in an oil bath at 160° C. for 30 minutes for polymerization. Transparent polymers in a substantially melted state were obtained.

Table 5

| Amount of addition of catalyst (%) | Monomer conversion (%) | Molecular weight |
|---|---|---|
| 0.3 | 68.3 | 52600 |
| 0.5 | 90.6 | 52400 |
| 1.0 | 86.9 | 38800 |

EXAMPLE 6

In a monomer mixture consisting of 90 % acrylonitrile and 10 % methyl acrylate, 0.5 % di-tert-butyl peroxide was dissolved as the catalyst. The mixing ratio of this monomer solution and water was varied as in Table 6. The mixed solutions were subjected to polymerization at 160° C. for 30 minutes as in Example 1. In both cases, a transparent polymer fluid in a substantially melted state were obtained. The results of the polymerization are shown in Table 6.

Table 6

| Ratio monomer/water | Monomer conversion (%) | Molecular weight |
|---|---|---|
| 80/20 | 86.9 | 38800 |
| 60/40 | 77.3 | 38700 |

EXAMPLE 7

Continuous polymerization is carried out using a stainless polymerization tube, 10 mm in inner diameter, which contains a built-in Kenics Mixer (produced by Kenics Corp., U.S.A.) as the mixing device. One end of the polymerization tube is joined to a plunger pump through the intermediary of a 3 mm $\phi$ orifice. The polymerization tube is arranged so as to be heated to 155° C. with ethylene glycol as the heating medium. At the start of the polymerization, the nozzle orifice, which is intended for the outlet of the polymerization tube, is closed up, and thereafter the plunger pump is started to supply a monomer solution and water. During this time, the closing condition of the nozzle orifice is controlled so that the pressure in the polymerization tube can be always maintained about at 10 – 15 kg/cm² (gauge pressure). After the polymerization has progressed and just reached a point of time at which the polymer begins to extrude itself, the shutting object is removed, whereby continuous an stable extrusion of the polymer is achieved.

By following this procedure, a monomer mixture composed of 90 % acrylonitrile and 10 % methyl acrylate was subjected to continuous polymerization under the following polymerization conditions:

Supply rate of the monomer solution; 1.6 parts/min.
Supply rate of water; 0.4 part/min.
Catalyst (Di-tert-butyl peroxide) 1.0%
Retarding agent (2,6-di-tert-butyl-4-methylphenol) 1.0 %

The acrylonitrile copolymer melt was extruded stably from the nozzle orifice provided at the outlet side of the polymerization tube. Incidentally, the catalyst and the retarding agent were supplied after they were dissolved in the monomer solution.

EXAMPLE 8

In a monomer mixture consisting of 90 % acrylonitrile and 10 % methyl acrylate, 0.5 % di-tert-butyl peroxide was dissolved as the catalyst. The mixing ratio of this monomer solution and water was varied as in Table 7. The mixed solutions were subjected to polymerization at a temperature of 150° C. for 60 minutes in the same manner as in Example 1. As a result, in each case, a transparent polymer fluid in a substantially melted state was obtained. The results of the polymerization are shown in Table 7.

Table 7

| Ratio of Monomer/water | Monomer conversion (%) | Molecular weight |
|---|---|---|
| 95/5 | 91.5 | 124,100 |
| 90/10 | 92.4 | 107,500 |
| 85/15 | 93.5 | 96,900 |

EXAMPLE 9

In a monomer mixture consisting of 90 % acrylonitrile and 10 % methyl acrylate, 1 % di-tert-butyl peroxide as the catalyst and 0.8 % benzyl amine as the chain transfer agent (the percentages being on the weight of the monomer mixture) were mixed and dissolved.

Then, such monomer solution was mixed with water at various ratios shown in Table 8. The mixed solutions were then subjected to polymerization at a temperature of about 120° C. for 35 or 60 minutes in the same manner as in Example 1.

The thus obtained polymerization products were transparent and showed a favorable fluidity in case the monomer/water ratio was 50/50 to 90/10 but were in a half melted state in which about 30 % unmelted part was present in case the monomer/water ratio was 35/65 and 20/80. The results of the polymerization are shown in Table 8.

Table 8

| Ratio of monomer /water | Polymerization time (minutes) | Monomer conversion (%) | Molecular weight | Appearance |
|---|---|---|---|---|
| 90/10 | 35 | 81.7 | — | Melted |
|  | 60 | 84.0 | 71,900 | " |
| 80/20 | 35 | 82.3 | — | " |
|  | 60 | 97.3 | 66,800 | " |
| 65/35 | 60 | 80.0 | 80,000 | " |
| 50/50 | 60 | 77.8 | 79,000 | " |
| 35/65 | 60 | 61.1 | 76,400 | Half melted |
| 20/80 | 60 | 42.0 | — | " |

EXAMPLE 10

In a monomer mixture consisting of 90 % acrylonitrile and 10 % methyl acrylate, 0.5 or 1.0 % di-tert-butyl peroxide was dissolved as the catalyst. Then, each monomer solution was mixed with water at a ratio of 80/20 or 65/35 (monomer/water). Then each mixed solution was subjected to polymerization at a temperature of 150° C. for 60 minutes in the same manner as in Example 1 in a sealed container to obtain a polymer melt showing a favorable fluidity.

When the thus obtained polymer melt was taken out into a normal pressure system under a heated state, the polymer became a foamed body.

What we claim is:

1. A process for the catalytic polymerization of acrylonitrile or a monomer mixture containing above 75% by weight of the mixture of acrylonitrile and at least one other ethylenically unsaturated compound, characterized in that the polymerization is conducted at a temperature above 120° C. under the internal pressure generated in a closed polymerization system or under external pressure above the vapor pressure generated in the polymerization system under such polymerization conditions wherein water is present in the system in a range of 5 to 20 percent by weight based on the total weight of the monomer(s) and water to produce an acrylonitrile polymer in a substantially molten state, said polymerization being conducted in the presence of an oil-soluble radical generating agent as a catalyst whose decomposing temperature to obtain a half-life period of 10 hours is about 80° C. selected from the group consisting of di-tert-butyl diperoxyphthalate, tert-butyl hydroperoxide, di-tert-butyl peroxide, 2,5-dimethyl-2,5-di-tert-butyl peroxyhexine, 4-azobis-4-cyanopentanoic amide and 1-azobis-1-cyclohexanecarbonitrile.

2. A process according to claim 1 wherein the polymerization is conducted at a temperature of 130° to 250° C.

3. A process according to claim 1 wherein the conversion is about 60 percent to about 97 percent.

4. A process according to claim 1 wherein the catalyst is an oil-soluble radical generation agent whose decomposing temperature to obtain a half-life period of 10 hours is above 100° C.

5. A process according to claim 1 wherein the catalyst is di-tert-butyl peroxide.

6. A process according to claim 1, wherein the polymerization is conducted under a pressure above 3 atmospheres.

7. A process according to claim 1, wherein the polymerization is conducted under a pressure of about 5 to about 50 atmospheres.

8. A process according to claim 1 wherein acrylonitrile is the sole monomer used in the polymerization to produce a homopolymer of acrylonitrile.

9. A process according to claim 1, wherein a monomeric mixture of acrylonitrile and another ethylenically unsaturated compound is polymerized.

* * * * *